US009531200B2

(12) United States Patent
Naddei

(10) Patent No.: US 9,531,200 B2
(45) Date of Patent: Dec. 27, 2016

(54) BATTERY CONDITIONING APPARATUS

(75) Inventor: Rosario Naddei, Eatons Hill (AU)

(73) Assignee: MEGAPULSE AUSTRALIA PTY LTD (AU)

(*) Notice: Subject to any disclaimer, the term of this patent is extended or adjusted under 35 U.S.C. 154(b) by 233 days.

(21) Appl. No.: 14/349,219

(22) PCT Filed: Sep. 10, 2012

(86) PCT No.: PCT/AU2012/001079
§ 371 (c)(1),
(2), (4) Date: May 28, 2014

(87) PCT Pub. No.: WO2013/049879
PCT Pub. Date: Apr. 11, 2013

(65) Prior Publication Data
US 2014/0327388 A1  Nov. 6, 2014

(30) Foreign Application Priority Data
Oct. 3, 2011 (AU) .................. 2011904076

(51) Int. Cl.
| | | |
|---|---|---|
| H02J 7/00 | (2006.01) | |
| H01M 6/50 | (2006.01) | |
| B60L 11/18 | (2006.01) | |
| H01M 10/06 | (2006.01) | |
| H01M 10/42 | (2006.01) | |

(52) U.S. Cl.
CPC .............. *H02J 7/00* (2013.01); *B60L 11/18* (2013.01); *B60L 11/1816* (2013.01); *H02J 7/0075* (2013.01); *H02J 7/0093* (2013.01); *H01M 10/06* (2013.01); *H01M 10/4242* (2013.01); *H02J 7/0047* (2013.01); *H02J 7/0057* (2013.01)

(58) Field of Classification Search
CPC .......... H02J 7/00; H02J 7/0093; H02J 7/0075; H02J 2007/105; H02J 7/0021; H02J 7/0047; H01M 10/06; H01M 2220/20; Y02E 60/126; Y02T 10/7016; B60L 11/1816; B60L 11/18
USPC ........ 320/104, 106, 107, 129, 139, 140, 141
See application file for complete search history.

(56) References Cited

U.S. PATENT DOCUMENTS

| | | | |
|---|---|---|---|
| 4,829,225 A | | 5/1989 | Podrazhansky et al. |
| 5,281,919 A | * | 1/1994 | Palanisamy .......... G01R 31/007 324/427 |
| 5,463,305 A | * | 10/1995 | Koenck ................... H02J 9/061 320/145 |
| 5,525,892 A | * | 6/1996 | Phommarath ......... H02J 7/0093 320/139 |
| 5,648,714 A | | 7/1997 | Eryou et al. |
| 5,694,023 A | * | 12/1997 | Podrazhansky ....... H01M 10/44 320/129 |

(Continued)

FOREIGN PATENT DOCUMENTS

| | | |
|---|---|---|
| WO | WO 93/15543 A1 | 8/1993 |
| WO | WO 03/079514 A1 | 9/2003 |

*Primary Examiner* — Helen Rossoshek
(74) *Attorney, Agent, or Firm* — Blank Rome LLP

(57) ABSTRACT

The present invention relates to a battery conditioning apparatus for conditioning a battery. The apparatus includes a pulse generator circuit for generating pulses to be applied to the battery. A loading circuit is provided for loading the battery. The apparatus also includes a controller for controlling the pulse generator circuit and loading circuit to concurrently apply the pulses to and load the battery.

19 Claims, 3 Drawing Sheets

(56) References Cited

U.S. PATENT DOCUMENTS

| | | | | |
|---|---|---|---|---|
| 6,507,169 | B1 * | 1/2003 | Holtom | B60L 3/0046 320/106 |
| 6,822,425 | B2 * | 11/2004 | Krieger | H02J 7/0054 320/137 |
| 6,859,016 | B2 | 2/2005 | Dotzler | |
| 7,375,491 | B2 * | 5/2008 | Lin | H02J 7/0073 320/107 |
| 7,477,041 | B2 * | 1/2009 | Le Gall | H01M 10/44 320/141 |
| 7,541,778 | B2 * | 6/2009 | Maleus | H01M 10/44 320/140 |
| 7,592,094 | B2 * | 9/2009 | Kelly | H01M 4/12 429/48 |
| 7,750,604 | B2 * | 7/2010 | Hartular | H01M 10/44 320/132 |
| 7,834,592 | B2 * | 11/2010 | Smith | H02J 7/0093 320/139 |
| 7,888,914 | B2 * | 2/2011 | Ng | H02J 7/0057 320/128 |
| 2001/0019257 | A1 * | 9/2001 | Bynum | H02J 7/0093 320/141 |
| 2005/0168227 | A1 * | 8/2005 | Naddei | H02J 7/0075 324/433 |
| 2006/0065547 | A1 | 3/2006 | Okuno | |
| 2006/0145658 | A1 * | 7/2006 | Wang | H02J 7/0047 320/107 |
| 2007/0139011 | A1 * | 6/2007 | Lin | H02J 7/0073 320/128 |
| 2008/0143299 | A1 | 6/2008 | Altman | |
| 2008/0252260 | A1 * | 10/2008 | Biggs | H02J 7/0093 320/139 |
| 2009/0121684 | A1 | 5/2009 | Hussain et al. | |
| 2010/0019773 | A1 * | 1/2010 | Son | B66F 9/24 324/431 |
| 2010/0164437 | A1 | 7/2010 | McKinley et al. | |
| 2010/0264882 | A1 * | 10/2010 | Hartular | H01M 10/44 320/139 |
| 2011/0031932 | A1 * | 2/2011 | Platonov | H01M 10/44 320/134 |
| 2011/0074432 | A1 * | 3/2011 | Tinnemeyer | G01R 31/3606 324/426 |
| 2011/0106280 | A1 * | 5/2011 | Zeier | H01M 10/42 700/90 |
| 2011/0311844 | A1 * | 12/2011 | Han | H01M 10/54 429/49 |

* cited by examiner

BATTERY CONDITIONING APPARATUS

REFERENCE TO RELATED APPLICATIONS

The present application is a National Stage of International Patent Application No. PCT/AU2012/001079, filed Sept. 10, 2012, which claims the benefit of AU 201194076, filed Oct. 3, 2011, whose disclosures are hereby incorporated by reference in their entirety into the present disclosure.

TECHNICAL FIELD

The present invention relates to a battery conditioning apparatus. The present invention has particular, although not exclusive application to automobile batteries.

BACKGROUND

The reference to any prior art in this specification is not, and should not be taken as an acknowledgement or any form of suggestion that the prior art forms part of the common general knowledge.

Battery conditioning apparatus' prevent or reverse the accumulation of lead sulphate on the electrodes of a lead-acid battery by generating electrical pulses that are applied to the terminals of the battery. It has been found that such conditioning apparatus' can significantly increase the operating life and efficiency of batteries.

AU 2003249756 discloses a known battery conditioning apparatus including discrete circuit components. Undesirably, this apparatus only yields suitable conditioning performance for a particular battery voltage and therefore multiple models of the apparatus, with different component values, are required to accommodate for corresponding battery voltages.

The preferred embodiment of the present invention provides an improved battery conditioning apparatus.

SUMMARY OF THE INVENTION

According to one aspect of the present invention, there is provided a battery conditioning apparatus for conditioning a battery, the apparatus including:
 a pulse generator circuit for generating pulses to be applied to the battery;
 a loading circuit for loading the battery; and
 a controller for controlling the pulse generator circuit and loading circuit to concurrently apply the pulses to and load the battery.

Concurrently applying the pulses to and loading the battery results in improved battery conditioning when compared with known conditioning methods.

The battery conditioning apparatus may further include a power supply circuit for powering the apparatus from any vehicle battery (e.g. rated from 6 to 48V), without the need for different apparatus models to accommodate different battery voltages. The power supply circuit may include a voltage regulator and pre-regulator circuitry connected to the input of the voltage regulator. The pre-regulator circuitry may be configured to restricting the current flowing into the voltage regulator and suppress voltage pulses input to the voltage regulator.

The battery conditioning apparatus may further include a user interface. The user interface may include a selector for selecting between conditional modes for said controlling of the apparatus. The user interface may include a display for displaying a selected mode of operation.

The battery conditioning apparatus may further include a battery voltage sensor circuit for sensing the battery voltage. The conditional modes of operation may relate to the sensed battery voltage.

The concurrently generated pulses and loading of the battery may both be performed at a fixed frequency. The fixed frequency may be between 1 kHz to 10 kHz, and preferably 5 kHz. Alternatively, the concurrently generated pulses and loading of the battery may sweep between 1 kHz to 10 kHz. The duty cycle of the loading of the battery may be based upon the sensed battery voltage.

The loading circuit may provide a short (or virtual short) across the battery. The loading circuit may include a resistance etched on a printed circuit board (PCB) of the apparatus. The controller may be further configured to periodically perform a load test of the battery to ascertain the integrity of the battery. The battery conditioning apparatus may further include a display for displaying the result of the load test.

The pulse generator circuit may not include an inductor, relying instead upon the inductance of the battery.

According to another aspect of the present invention, there is provided a method for conditioning a battery, the method including the step of concurrently applying pulses to and loading the battery.

The method may further include the step of conditionally applying the pulses to and loading the battery using the sensed voltage of the battery.

The method may further include the step of periodically performing a load test of the battery.

According to another aspect of the present invention, there is provided a battery conditioning apparatus for conditioning a battery, the apparatus including a power supply circuit for powering the apparatus from any vehicle battery, without the need for different apparatus models to accommodate different battery voltages.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to the following drawings.

DETAILED DESCRIPTION OF PREFERRED EMBODIMENTS

Figure 1A:
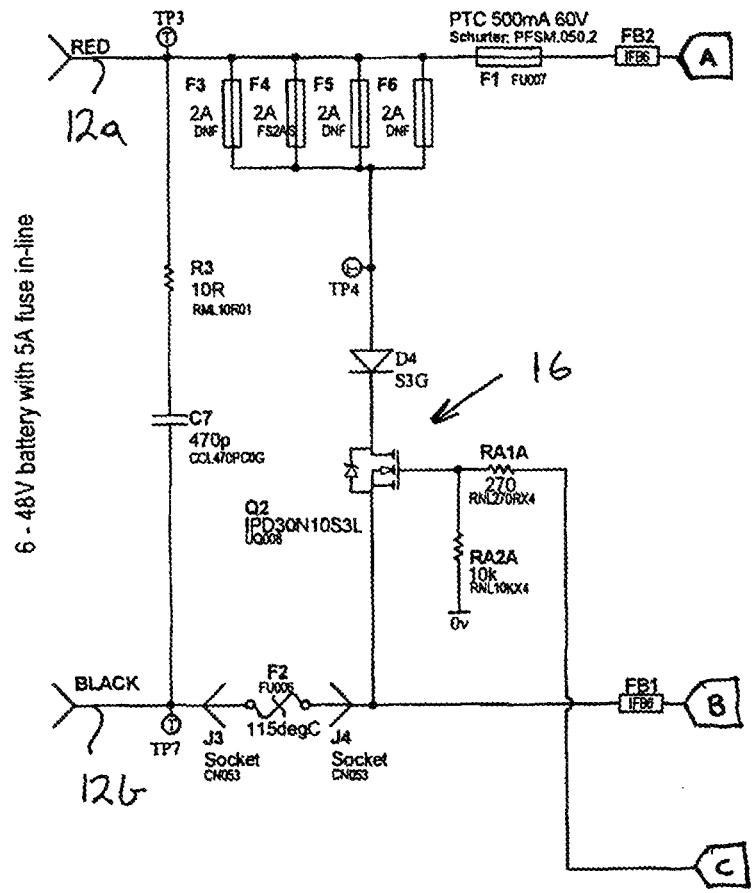
FIGS. 1a through 1c are schematic diagrams of a battery conditioning apparatus in accordance with an embodiment of the present invention.
Figure 1B:
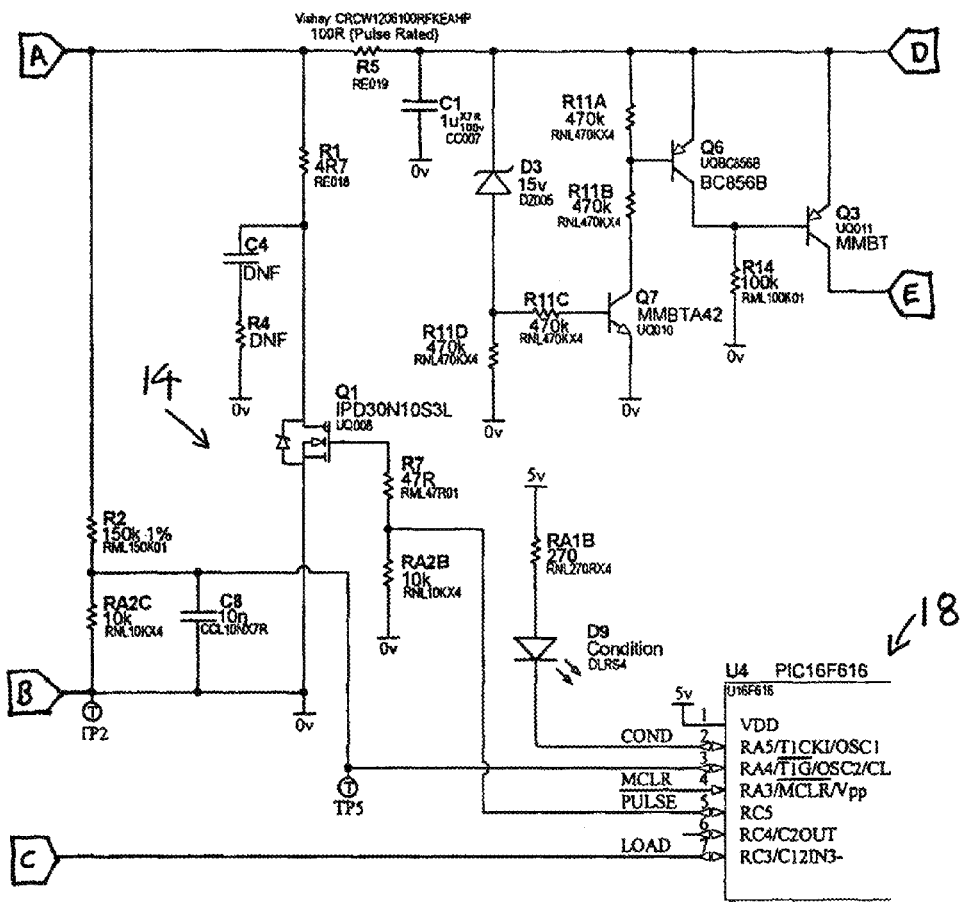
Figure 1C:
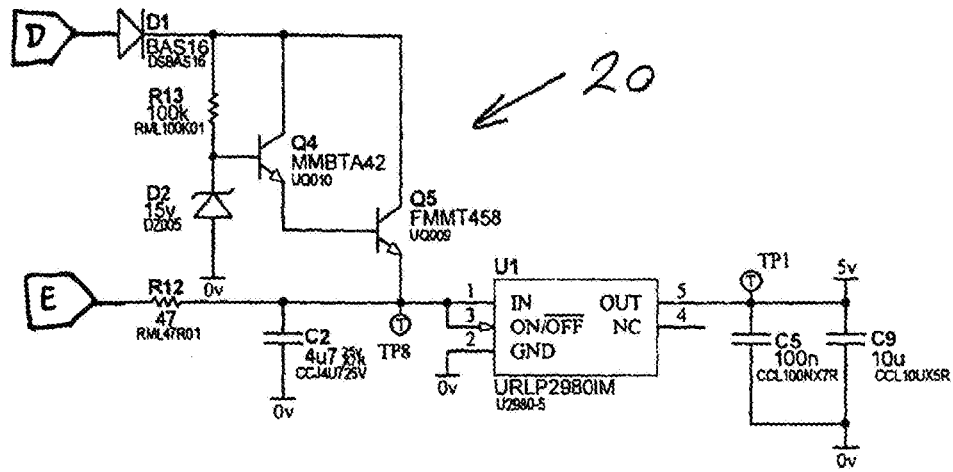
Figure 1C:
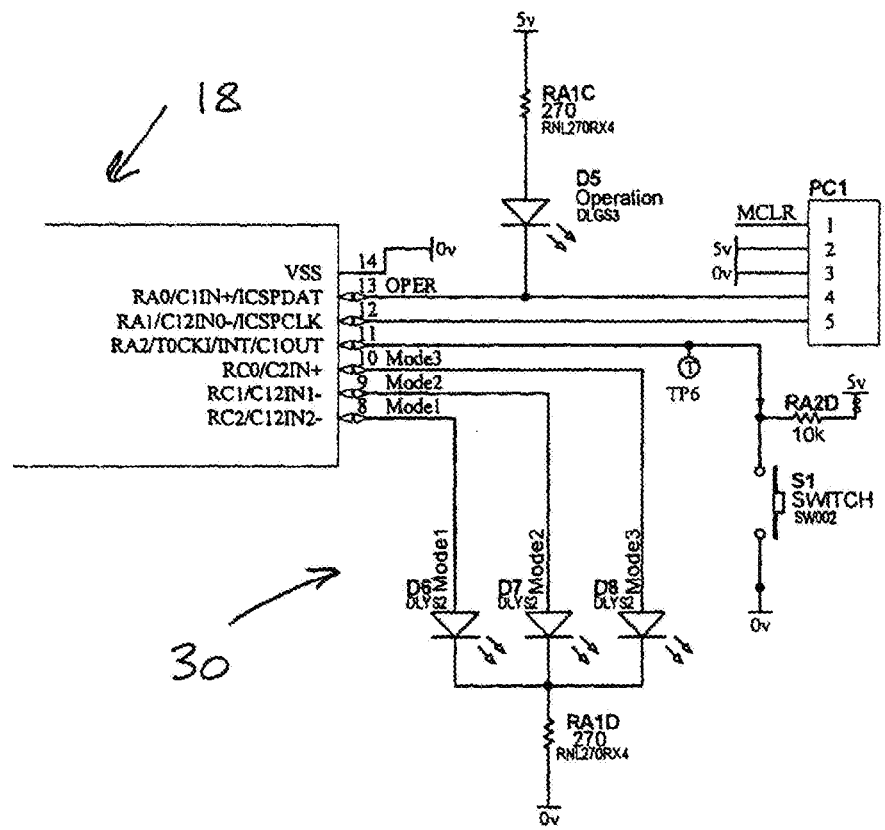

According to an embodiment of the present invention, there is provided a battery conditioning apparatus 10 for conditioning a vehicle battery (not shown) coupled to terminals 2a, 12b as shown in FIG. 1a. The apparatus 10 includes a pulse generator circuit 14 for generating pulses to be applied to the battery. A high-current loading circuit 16 is also provided for loading the battery. The apparatus 10 further includes a controller 18 for controlling the pulse generator 14 and loading circuit 16 to concurrently apply the pulses to and load the, battery which is an improvement over known conditioning methods. A detailed description of the apparatus 10 is provided below.

The battery conditioning apparatus 10 further includes a power supply circuit 20 for powering the apparatus from any battery rated from 6 and 48V, without the need for different apparatus models to accommodate different battery voltages. The power supply circuit 20 includes a voltage regulator U1 and pre-regulator circuitry including zener diodes D2, D3. The pre-regulator circuitry is connected to the input of the voltage regulator U1 and is configured to restrict the current flowing into the voltage regulator U1 to minimise battery current drain. The pre-regulator circuitry also suppresses voltage pulses input to the voltage regulator U1.

The battery conditioning apparatus 10 further includes a user interface 30. The user interface 30 includes a action switch selector S1 for selecting between various conditional modes (i.e. modes 1 to 3 below) for controlling the apparatus 10. The battery conditioning apparatus 10 further includes a battery voltage sensor circuit 32 including voltage divider R2, RA2C for sensing the voltage of the battery and providing feedback via input port 3 of microprocessor U4 of controller 18. The conditional modes of operation relate to the sensed battery voltage.

The user interface 30 also includes a light emitting diode (LED) display for displaying a selected mode of operation of the apparatus 10. The LED display includes three mode LEDs D6 to D8 which are actuated by the controller 18 in accordance with the mode of operation of the apparatus 10 as indicated below:

Mode 1: controller 18 controls the pulse generator 14 and loading circuit 16 to concurrently apply the pulses to and load the battery provided that the sensed battery voltage is above 10.5V (for a 12V vehicle battery). That is, the conditioning apparatus 10 conditions the vehicle battery all the time unless the battery is low and needs to be preserved:

Mode 2: controller 18 controls the pulse generator 14 and loading circuit 16 to concurrently apply the pulses to and load the battery when the sensed battery voltage is between 10.5V and 12.8V (for a 12V vehicle battery). That is, the conditioning apparatus 10 conditions the battery when the vehicle engine is not running.

Mode 3: controller 18 controls the pulse generator 14 and loading circuit 16 to concurrently apply the pulses to and load the battery when the sensed battery voltage is above 12.8V (for a 12V vehicle battery). That is, the conditioning apparatus 10 conditions the battery when the vehicle engine is running.

The high current loading circuit 16 provides a short (or virtual short) across the battery when the controller 18 actuates field effect transistor (FET) switch Q2. The loading circuit 16 includes a serpentine resistance (not shown) etched on a printed circuit board (PCB) of the apparatus 10. The controller 18 is further configured to actuate the switch Q2 and periodically perform a load test of the battery every twenty-one hours to ascertain the integrity of the battery.

The load test involves actuating switch Q2 for 5 milliseconds and sensing the battery voltage with sensing circuit 32. Load currents through Q2 of approx. 20 Amps and 40 Amps are present in 12V and 24V vehicle battery systems respectively. The load test is a pass if the sensed battery voltage drop during the load test is less than 2 V and is otherwise a fail.

The battery conditioning apparatus 10 further includes a load test display for displaying the result of the load test. The load test display includes a green load test pass LED D9 which the controller 18 illuminates responsive to a load test pass, and a red load test fail LED D5 which the controller 18 illuminates responsive to a load test failure.

During battery conditioning, the concurrently generated pulses and loading of the battery may both be performed at a fixed frequency of between 1 kHz to 10 kHz, and preferably 5 kHz. The duty cycle of the loading of the battery with the loading circuit 16 is based upon the sensed vehicle battery voltage as follows:

| Battery voltage | Loading circuit duty cycle |
| --- | --- |
| 6 V and 12 V | 0.4% |
| 24 V | 0.2% |
| 36 V and 48 V | 0.1% |

The controller 18 actuates the FET switch Q1 of the pulse generator circuit 14 with a 50% duty cycle. The pulse generator circuit 14 does not include an inductor, and instead relies upon the internal inductance of the battery to generate the pulses applied to the battery.

The concurrent controlling of the pulse generator 14 and loading circuit 16 to concurrently apply the pulses to and load the battery results in a desirable resultant waveform applied to the battery for improved conditioning. By short circuiting the battery with the loading circuit 16, the internal inductance of the battery advantageously causes "kicking back" of the applied pulses which is an improvement over known conditioning methods.

The apparatus 10 includes a resettable fuse F1 (or polyswitch), an external replaceable fuse F2 and up to four internal fuses F3 to F6.

A person skilled in the art will appreciate that many embodiments and variations can be made without departing from the ambit of the present invention.

In one embodiment, the concurrently generated pulses and loading of the battery may continuously sweep between 1 kHz to 10 kHz during conditioning of the battery.

In compliance with the statute, the invention has been described in language more or less specific to structural or methodical features. It is to be understood that the invention is not limited to specific features shown or described since the means herein described comprises preferred forms of putting the invention into effect.

The claims defining the invention are as follows:

1. A battery conditioning apparatus for conditioning a battery, the apparatus including:
   a pulse generator circuit with a pulsing switch generating a plurality of pulses with a frequency of greater than 1 kHz applied to the battery;
   a loading circuit with a loading switch configured to be separately and independently actuated from the pulse generator circuit by a processing controller controlling the respective pulsing and loading switches, and configured to load the battery separately and independently while the plurality of pulses from the pulse generator circuit are applied to the battery so that internal inductance of the battery facilitates conditioning; and
   a battery sensing circuit configured to sense a parameter of the battery and provide that sensed parameter to the processing controller;
   wherein the processing controller is configured to separately and independently control the pulse generator circuit and loading circuit to concurrently apply the pulses to and load the battery, the applied pulses and load being conditionally applied by the processing controller using the sensed parameter of the battery.

2. The battery conditioning apparatus as claimed in claim 1, further including a power supply circuit powering the apparatus from any vehicle battery irrespective of voltage rating.

3. The battery conditioning apparatus as claimed in claim 2, wherein the power supply circuit includes a voltage regulator and pre-regulator circuitry connected to the input of the voltage regulator for regulating input voltages to the battery conditioning apparatus.

4. The battery conditioning apparatus as claimed in claim 3, wherein the pre-regulator circuitry is configured to restrict the current flowing into the voltage regulator and suppress voltage pulses input to the voltage regulator.

5. The battery conditioning apparatus as claimed in claim 1, further including a user interface including a selector for selecting between conditional modes for said controlling of the apparatus.

6. The battery conditioning apparatus as claimed in claim 5, wherein the user interface includes a display for displaying a selected mode.

7. The battery conditioning apparatus as claimed in claim 5, wherein the battery sensing circuit comprises a battery voltage sensor circuit and the sensed parameter is the battery voltage, the conditional modes relating to the sensed battery voltage and the sensed battery voltage is used by the controller to determine when the battery is conditioned based upon the selected conditioning mode.

8. The battery conditioning apparatus as claimed in claim 1, wherein the concurrently generated pulses and loading of the battery are both performed at a fixed frequency.

9. The battery conditioning apparatus as claimed in claim 8, wherein the fixed frequency is between 1 kHz to 10 kHz.

10. The battery conditioning apparatus as claimed in claim 1, wherein the concurrently generated pulses and loading of the battery sweep between 1 kHz to 10 kHz.

11. The battery conditioning apparatus as claimed in claim 1, wherein the duty cycle of the loading of the battery is based upon a sensed battery voltage.

12. The battery conditioning apparatus as claimed in claim 1, wherein the separate loading circuit provides a short or virtual short across the battery to facilitate battery conditioning.

13. The battery conditioning apparatus as claimed in claim 1, wherein the loading circuit includes a resistance etched on a printed circuit board (PCB) of the apparatus.

14. The battery conditioning apparatus as claimed in claim 1, wherein the controller is further configured to periodically perform a load test of the battery to ascertain the integrity of the battery.

15. The battery conditioning apparatus as claimed in claim 14, further including a display for displaying the result of the load test.

16. The battery conditioning apparatus as claimed in claim 1, wherein the pulse generator circuit does not include an inductor, relying instead upon the inductance of the battery.

17. The battery conditioning apparatus as claimed in claim 1, wherein the processing controller is configured to periodically perform a load test of the battery by actuating the loading switch.

18. The battery conditioning apparatus as claimed in claim 1, further configured to receive power from any vehicle battery rated from 6 to 48V which is the battery being conditioned.

19. The battery conditioning apparatus as claimed in claim 1, wherein the pulsing switch and the loading switch each include a Field Effect Transistor (FET) switch.

* * * * *